(12) United States Patent
Asai

(10) Patent No.: US 10,838,202 B2
(45) Date of Patent: Nov. 17, 2020

(54) IMAGE DISPLAY DEVICE AND HEADUP DISPLAY EQUIPPED WITH IMAGE DISPLAY DEVICE

(71) Applicant: Panasonic Intellectual Property Management Co., Ltd., Osaka (JP)

(72) Inventor: Yosuke Asai, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 229 days.

(21) Appl. No.: 15/975,871

(22) Filed: May 10, 2018

(65) Prior Publication Data
US 2018/0259773 A1    Sep. 13, 2018

Related U.S. Application Data

(63) Continuation of application No. PCT/JP2016/004100, filed on Sep. 8, 2016.

(30) Foreign Application Priority Data

Nov. 30, 2015 (JP) .................................. 2015-233092

(51) Int. Cl.
*G02B 27/01* (2006.01)
*F21S 2/00* (2016.01)
(Continued)

(52) U.S. Cl.
CPC .......... *G02B 27/0101* (2013.01); *F21S 2/00* (2013.01); *G02B 6/002* (2013.01); *G02B 6/003* (2013.01);
(Continued)

(58) Field of Classification Search
None
See application file for complete search history.

(56) References Cited

U.S. PATENT DOCUMENTS 8,033,706 B1   10/2011   Kelly et al.
2004/0246697 A1*  12/2004   Yamashita ........... G02B 6/0038
                                                    362/612
(Continued)

FOREIGN PATENT DOCUMENTS

JP    2002-289023    10/2002
JP    2004-171948    6/2004
(Continued)

OTHER PUBLICATIONS

International Search Report of PCT application No. PCT/JP2016/004100 dated Nov. 22, 2016.
(Continued)

*Primary Examiner* — William R Alexander
*Assistant Examiner* — Gary W O'Neill
(74) *Attorney, Agent, or Firm* — Greenblum & Bernstein, P.L.C.

(57) ABSTRACT

Image display device is used in a head-up display. Image display device includes an illumination unit, light guide plate, light beam controller, and display unit. The illumination unit includes a plurality of light sources. Light guide plate includes incident surface into which light from the illumination unit enters, incident surface including a plurality of convex surfaces each of which is opposed to each of the plurality of light sources, and output surface disposed in a direction intersecting incident surface and from which the light incident from incident surface is output. Light beam controller controls a traveling direction of the light output from output surface. Display unit transmits the light output from light beam controller to display an image.

16 Claims, 10 Drawing Sheets

(51) Int. Cl.
*F21V 8/00* (2006.01)
*G02B 27/09* (2006.01)

(52) U.S. Cl.
CPC ......... *G02B 6/0033* (2013.01); *G02B 6/0038* (2013.01); *G02B 6/0053* (2013.01); *G02B 6/0061* (2013.01); *G02B 27/01* (2013.01); *G02B 27/0955* (2013.01); *G02B 27/0983* (2013.01); *B60K 2370/334* (2019.05); *G02B 6/0045* (2013.01); *G02B 6/0046* (2013.01); *G02B 6/0051* (2013.01)

(56) References Cited

U.S. PATENT DOCUMENTS

| | | | |
|---|---|---|---|
| 2006/0215401 A1* | 9/2006 | Menzel | G02B 27/0101 362/235 |
| 2007/0109464 A1 | 5/2007 | Jung et al. | |
| 2007/0242475 A1 | 10/2007 | Minobe et al. | |
| 2008/0117491 A1* | 5/2008 | Robinson | G02B 27/0955 359/237 |
| 2009/0135627 A1 | 5/2009 | Furuyama et al. | |
| 2009/0316072 A1 | 12/2009 | Okumura et al. | |
| 2013/0208363 A1* | 8/2013 | Masuda | G02B 27/0101 359/630 |
| 2013/0335821 A1 | 12/2013 | Robinson et al. | |

FOREIGN PATENT DOCUMENTS

| | | |
|---|---|---|
| JP | 2005-352400 | 12/2005 |
| JP | 2006-059763 | 3/2006 |
| JP | 2007-073469 | 3/2007 |
| JP | 2007-335323 | 12/2007 |
| JP | 2009-128647 | 6/2009 |
| JP | 2015-038811 | 2/2015 |
| JP | 2015-525432 | 9/2015 |

OTHER PUBLICATIONS

The Extended European Search Report dated Dec. 3, 2018 for the related European Patent Application No. 16870152.2.
Communication pursuant to Article 94(3) EPC dated Jul. 22, 2019 for the related European Patent Application No. 16870152.2.

* cited by examiner

IMAGE DISPLAY DEVICE AND HEADUP DISPLAY EQUIPPED WITH IMAGE DISPLAY DEVICE

TECHNICAL FIELD

The present disclosure relates to an image display device in which a light guide plate is used and a head-up display equipped with the image display device.

BACKGROUND ART

PTL 1 discloses a method for causing a light beam emitted from a light source to enter light guide plate by deflecting the light beam using a linear Fresnel lens. Therefore, a light distribution spreading a direction perpendicular to a traveling direction of the light is narrowed, and front luminance increases.

CITATION LIST

Patent Literature

PTL 1: Unexamined Japanese Patent Publication No. 2007-73469

SUMMARY OF THE INVENTION

An image display device according to a present disclosure is used in a head-up display. The image display device includes an illumination unit, a light guide plate, a light beam controller, and a display unit. The illumination unit includes a plurality of light sources. The light guide plate includes a first region includes an incident surface into which light from the illumination unit enters, the incident surface including a plurality of convex surfaces each of which is opposed to each of the plurality of light sources, and a second region includes an output surface disposed in a direction intersecting the incident surface and from which the light incident from the incident surface is output. The light beam controller controls a traveling direction of the light output from output surface. The display unit is disposed opposed to the output surface, and transmits the light output from the light beam controller to display an image. A lenticular lens array is provided in a surface of the light guide plate, the surface being not opposed to the display unit and being in a direction identical to the output surface in the first region.

A head-up display according to the present disclosure includes an image display device and a reflection optical unit that reflects the light output from the image display device. The head-up display introduces the light output from the reflection optical unit to an eye-box of an observer through a transparent member, and causes the observer to visually recognize a virtual image. The image display device includes an illumination unit, a light guide plate, a light beam controller, and a display unit. The illumination unit includes a plurality of light sources. The light guide plate includes an incident surface into which light from the illumination unit enters, the incident surface including a plurality of convex surfaces each of which is opposed to each of the plurality of light sources, and a second region including an output surface disposed in a direction intersecting the incident surface and from which the light incident from the incident surface is output. The light beam controller controls a traveling direction of the light output from output surface. The display unit is disposed opposed to the output surface, and transmits the light output from the light beam controller to display an image. A lenticular lens array being provided in a surface of the light guide plate, the surface being not opposed to the display unit and being in a direction identical to the output surface in the first region The high front luminance is obtained in the image display device and the head-up display of the present disclosure.

DESCRIPTION OF EMBODIMENTS

Hereinafter, exemplary embodiments will be described in detail with reference to the drawings as appropriate. However, detailed description more than necessary may be omitted. For example, detailed description of a known matter or repetitive description of a substantially identical configuration may be omitted. This is to avoid the following description from becoming unnecessarily redundant, and to ease understanding of those skilled in the art.

It is noted that the inventors provide attached drawings and the following description for those skilled in the art to fully understand the present disclosure, and do not intend to limit the subject matter as described in the appended claims.

First Exemplary Embodiment

A first exemplary embodiment will be described below with reference to FIGS. 1 to 6.

[1-1. Outline]

Figure 1:
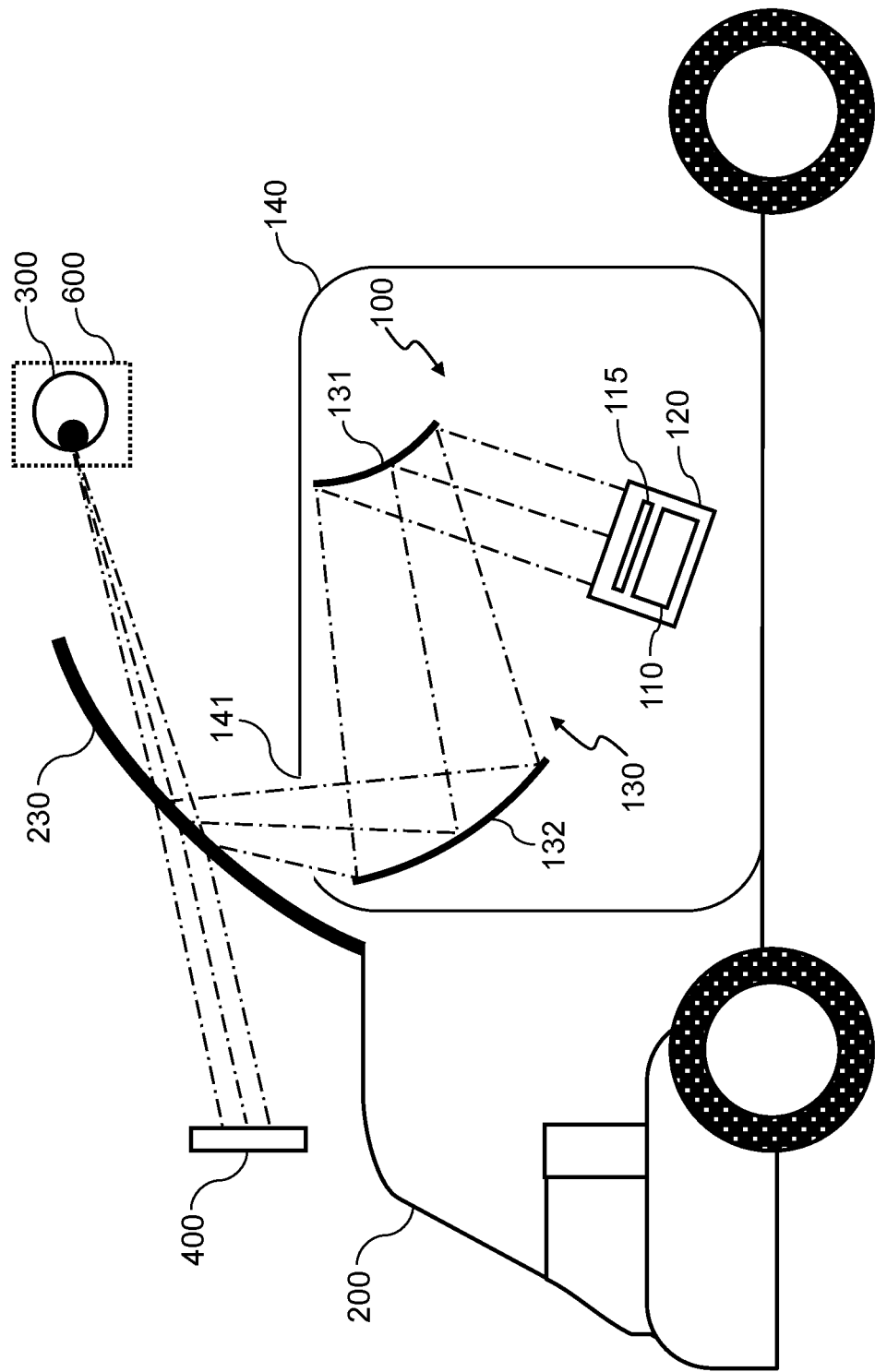
FIG. 1 is a schematic diagram illustrating a vehicle equipped with a head-up display according to a first exemplary embodiment.

FIG. 1 is a schematic diagram illustrating vehicle 200 equipped with head-up display 100 according to a first exemplary embodiment. For example, a driver gets in vehicle 200 as observer 300. Vehicle 200 includes windshield 230, i.e., a front glass, as a transparent member.

Light output from liquid crystal panel (transmission type display panel 115 to be described later) of head-up display 100 is guided into eye-box 600 of observer 300 through windshield 230. Therefore, observer 300 visually recognizes virtual image 400. As used herein, eye-box 600 means a region in which observer 300 can visually recognize the virtual image without any omission of the virtual image.

Figure 2:
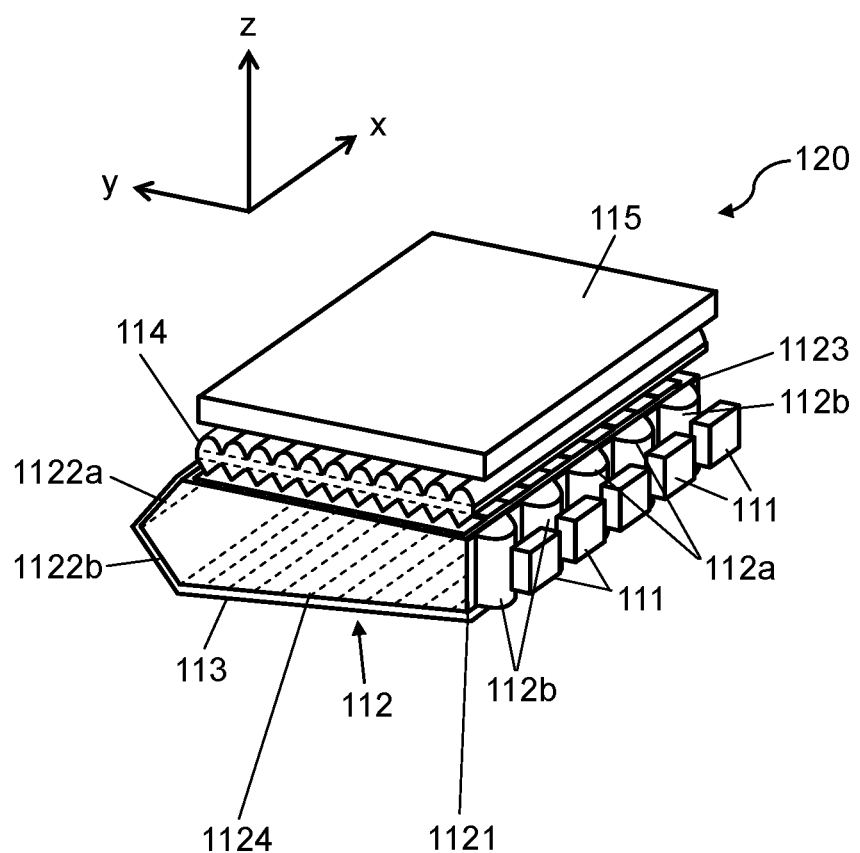
FIG. 2 is a schematic diagram illustrating an image display device according to the first exemplary embodiment.

Head-up display 100 includes image display device 120. FIG. 2 is a schematic diagram illustrating image display device 120 according to the first exemplary embodiment. Image display device 120 includes light guide plate 112. Incident surface 1121 of light guide plate 112 includes convex surface 112b.

The light incident on light guide plate 112 is deflected by convex surface 112b. Therefore, a light distribution of the light introduced to light guide plate 112 can be narrowed. As a result, the front luminance of image display device 120 can be improved.

For example, a linear Fresnel lens can be disposed between light source 111 and incident surface 1121 in order to narrow the light distribution of the light beam introduced to light guide plate 112. However, compared to the case where the linear Fresnel lens is used, in the first exemplary embodiment, the front luminance of image display device 120 can be improved with a small number of members.

[1-2. Configuration]
[1-2-1. Configuration of Head-Up Display]

A configuration of head-up display 100 of the first exemplary embodiment will be described below with reference to FIG. 1.

Head-up display 100 includes image display device 120 and reflection optical unit 130. Head-up display 100 is disposed inside housing 140. In FIG. 1, head-up display 100 and housing 140 are enlarged for easy understanding.

A configuration of image display device 120 will be described later.

Reflection optical unit 130 includes first mirror 131 and second mirror 132. First mirror 131 reflects the light output from transmission type display panel 115 of image display device 120, to be described later, toward second mirror 132. Second mirror 132 reflects the light from first mirror 131 toward windshield 230. A reflection surface of second mirror 132 has a concave shape. Reflection optical unit 130 is not necessarily configured by two mirrors. A number of mirrors may be one or at least three. Reflection optical unit 130 may include a refraction optical system such as a lens on an optical path.

Housing 140 includes opening 141. Opening 141 may include a transparent cover.

[1-2-2. Configuration of Image Display Device]

The configuration of image display device 120 of the first exemplary embodiment will be described below with reference to FIG. 2. In the following description, an output side (of the light) means an upper side in FIG. 2.

Image display device 120 includes a plurality of light sources 111, light guide plate 112, specular reflection member 113 that is the reflection member, light beam control member 114, and transmission type display panel 115 that is the display unit.

The plurality of light sources 111 are included in illumination device 110 that is an illumination unit in FIG. 1. As illustrated in FIG. 2, the plurality of light sources 111 are arrayed in line in a first direction (x-axis direction) with respect to image display device 120. Light source 111 is a light emitting body that supplies illumination light to transmission type display panel 115. For example, light source 111 is a chip type Light Emitting Diode (LED).

Light guide plate 112 is aligned with a second direction (y-axis direction) with respect to the plurality of light sources 111. Light guide plate 112 is disposed in proximity to light source 111 to an extent in which the output light beams of the plurality of light sources 111 do not leak. Light guide plate 112 is a transparent plate that guides the light. A surface of light guide plate 112 includes incident surface 1121, output surface 1123, inclined surface 1122a, inclined surface 1122b, and counter surface 1124.

The light beams emitted from the plurality of light sources 111 enter incident surface 1121. Incident surface 1121 includes a plurality of convex surfaces 112b each of which is opposed to each light source 111. Each convex surface 112b is a curved surface that projects toward a direction opposed to each light source 111. An axis of a curvature center of each convex surface 112b is perpendicular to an xy-plane. That is, the axis of a curvature center of each convex surface 112b is parallel to a third direction (z-axis direction). In light guide plate 112, a portion including each convex surface 112b is referred to as cylindrical shape part 112a. Each cylindrical shape part 112a has a semi-columnar shape in which a straight line parallel to the third direction is set to a generating axis. It is assumed that the third direction is a direction orthogonal to both the first direction and the second direction. A yz-section and an xz-section of each cylindrical shape part 112a have a rectangular shape. A plurality of cylindrical shape parts 112a are arrayed in the first direction. Each cylindrical shape part 112a is formed integral with light guide plate 112.

Output surface 1123 is disposed in a direction intersecting incident surface 1121. The light incident from incident surface 1121 is output from output surface 1123. Output surface 1123 is defined by the first direction and the second direction orthogonal to first direction.

Preferably, output surface 1123 includes a lenticular lens shape part. The lenticular lens shape part is configured by the plurality of cylindrical shape parts. Preferably, the generating axis of each cylindrical shape part is parallel to the second direction. Preferably, the cylindrical shape parts are arrayed in the first direction. The cylindrical shape parts can reduce stripe luminance unevenness, which is arranged in the first direction and is parallel to the second direction.

Counter surface 1124 is opposed to output surface 1123. Counter surface 1124 is inclined with respect to output surface 1123. A gap between counter surface 1124 and output surface 1123 increases with increasing distance from incident surface 1121. The above-described gap between counter surface 1124 and output surface 1123 means a gap in the third direction. Because the gap increases gradually, in light guide plate 112, a section (yz-section) defined by the second direction and the third direction has a wedge shape.

Preferably, counter surface 1124 includes the lenticular lens shape part. The lenticular lens shape part is configured by the plurality of cylindrical shape parts. Preferably, the generating axis of each cylindrical shape part is parallel to the first direction. Preferably, the cylindrical shape parts are arrayed in the second direction. The cylindrical shape parts can reduce stripe luminance unevenness, which is arranged in the second direction and is parallel to the first direction.

The inclined surface includes inclined surface 1122a and inclined surface 1122b. Both inclined surface 1122a and inclined surface 1122b are opposed to incident surface 1121. Inclined surface 1122a and inclined surface 1122b are inclined with respect to both output surface 1123 and counter surface 1124. The number of inclined surfaces may be one or at least two. Inclined surface 1122a and inclined surface 1122b change an angle of the light beam guided to inclined surface 1122a and inclined surface 1122b with respect to the second direction.

Specular reflection member 113 is disposed on a side opposite to at least output surface 1123, namely, a counter surface 1124 side. In the first exemplary embodiment, specular reflection member 113 is disposed along light guide plate 112 in a surface other than incident surface 1121 and output surface 1123 in a surface of light guide plate 112. Specular reflection member 113 reflects the light inward light guide plate 112 again when the light incident from incident surface 1121 on light guide plate 112 is output from a surface other than output surface 1123. Desirably, specular reflection member 113 is made of a material having a reflectance as high as possible. For example, specular reflection member 113 is made of metal. Specular reflection member 113 is formed by evaporating a metallic film on light guide plate 112 or by gluing a metallic film onto light guide plate 112.

Light beam control member 114 is disposed on an output side of light guide plate 112. That is, light beam control member 114 is disposed between light guide plate 112 and transmission type display panel 115. Light beam control member 114 includes a line of triangular prisms in a surface opposed to light guide plate 112. The triangular prisms have a triangle pole shape in which an axis parallel to the first direction is set to the generating axis. The triangular prisms are arrayed in the second direction. Preferably, the triangular prism has a vertical angle of about 60 degrees. The light beam output from light guide plate 112 to light beam control member 114 is raised in the third direction. Since the light beam is output from light guide plate 112 at an angle at which a total reflection condition is broken, the output light has the angle of 60 degrees to 70 degrees with respect to the third direction. The vertical angle of the triangular prism is set to about 60 degrees, which allows the luminance to be maximized when image display device 120 is viewed from the third direction. In light beam control member 114, a row of cylindrical lenses is included in a surface opposite to a surface in which the triangular prisms are formed, namely, a surface on the output side. The cylindrical lenses have a semi-columnar shape in which the axis parallel to the first direction is set to the generating axis. The cylindrical lenses are arrayed in the second direction. The cylindrical lens deflects the light raised in the third direction by the triangular prism, and improves the front luminance. The row of triangular prisms and the row of cylindrical lenses have an equal pitch. Preferably, each triangular prism and each cylindrical lens are disposed opposed to each other such that the positions in the third direction of the triangular prism and the cylindrical coincide with each other. When the triangular prism and the cylindrical lens are disposed in this way, evenness of a luminance distribution is improved as a whole in the case where the display of image display device 120 is observed from the third direction. The pitch of the row of triangular prisms may be equal to the pitch of the row of cylindrical lenses, and the positions in the third direction of each triangular prism and each cylindrical lens may be displaced from each other. Therefore, the luminance can be maximized in the case where the display of image display device 120 is observed from a direction having an angle with respect to the third direction. Desirably, the pitches of the row of triangular prisms and the row of cylindrical lenses are decreased to such an extent that the pitches are not visually recognized. Specifically, the pitches are set to about 0.1 mm or less.

Transmission type display panel 115 is disposed on the output side of light beam control member 114. For example, transmission type display panel 115 is a dot matrix display system Thin Film Transistor (TFT) transmission type liquid crystal panel.

Light guide plate 112 and light beam control member 114 are made of a transparent material having a predetermined refractive index. For example, the refractive index of the transparent material ranges from about 1.4 to 1.6. Examples of the transparent material include epoxy resin, silicone resin, acrylic resin, and resin such as polycarbonate. In the first exemplary embodiment, polycarbonate is used in consideration of a heat-resistant property. In the first exemplary embodiment, image display device 120 is used as head-up display 100 in which a range of eye-box 600 is relatively limited. In other words, the light output from image display device 120 has relatively high directivity. Accordingly, a material that does not substantially include a scattering material is used as a material for light guide plate 112. Therefore, the light beam having the directivity is guided while repetitively reflected in light guide plate 112.

[1-3. Detailed Description of Optical Path]

An optical path of the light beam, which is emitted from light source 111 and output from transmission type display panel 115, will be described below.

Figure 3:
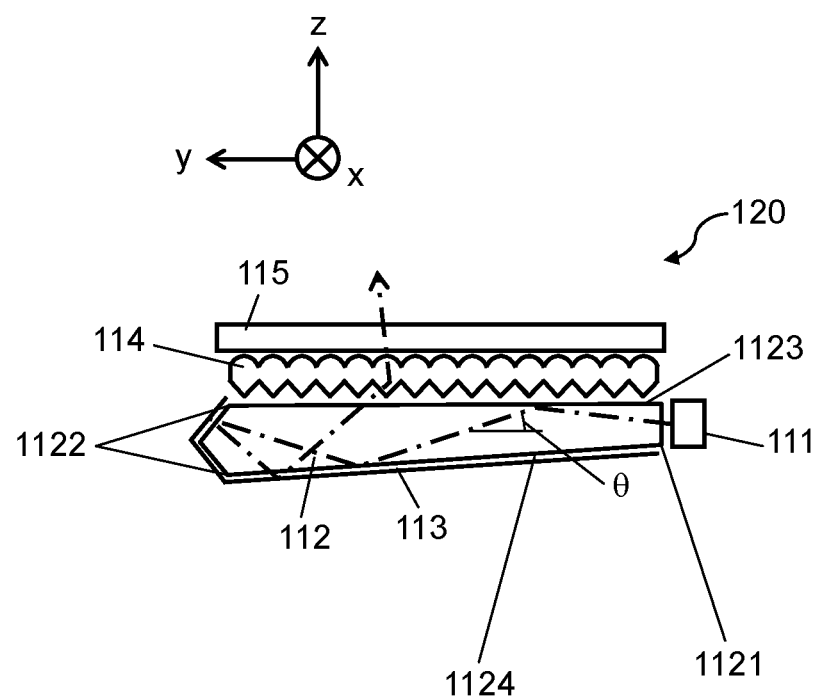
FIG. 3 is a schematic diagram illustrating a section of the image display device according to the first exemplary embodiment.

FIG. 3 is a schematic diagram illustrating a section of the image display device 120 according to the first exemplary embodiment. The section in FIG. 3 is a surface defined by the second direction and the third direction, namely, the yz-section. An alternate long and short dash line in FIG. 3 indicates the optical path in which the light emitted from light source 111 is output from transmission type display panel 115 through light guide plate 112 and light beam control member 114.

The plurality of light sources 111 emit light. The light emitted from each light source 111 enters incident surface 1121 of light guide plate 112, and travels along the second direction in light guide plate 112. Because a thickness in the third direction of light guide plate 112 increases with increasing distance from incident surface 1121 in the second direction, an angle $\theta$ formed between the light beam and a y-axis decreases as the light travels along the second direction. Accordingly, the light is guided to the second direction without substantially leaking to the outside of light guide plate 112.

The light guided to light guide plate 112 is reflected by inclined surface 1122a and inclined surface 1122b, and guided into light guide plate 112 toward incident surface 1121. Angle $\theta$ of the light reflected from inclined surface 1122a and inclined surface 1122b increases as a smaller angle of the angles formed between the y-axis and inclined surface 1122a and inclined surface 1122b increases. With increasing angle $\theta$, the light reflected from inclined surface 1122a is extracted from neighborhoods of inclined surface 1122a and inclined surface 1122b of light guide plate 112 through output surface 1123, and guided to the third direction. Light guide plate 112 has the wedge shape that becomes thinner toward a traveling direction of the reflected light. Accordingly, angle $\theta$ of the light reflected from inclined surface 1122a and inclined surface 1122b increases gradually by the repetition of the reflection. The reflected light gradually breaks the total reflection condition. The light reflected from inclined surface 1122a and inclined surface 1122b is gradually extracted from output surface 1123. As a result, the evenness of the luminance distribution of the image display device increases.

Light beam control member 114 converts the angle with respect to the third direction of the light beam extracted from output surface 1123, and the light is transmitted through transmission type display panel 115.

The light beam extracted from counter surface 1124 is reflected by specular reflection member 113. The reflected light passes through output surface 1123. Light beam control member 114 converts the angle with respect to the third direction of the light passing through output surface 1123, and the light is transmitted through transmission type display panel 115.

Figure 4:
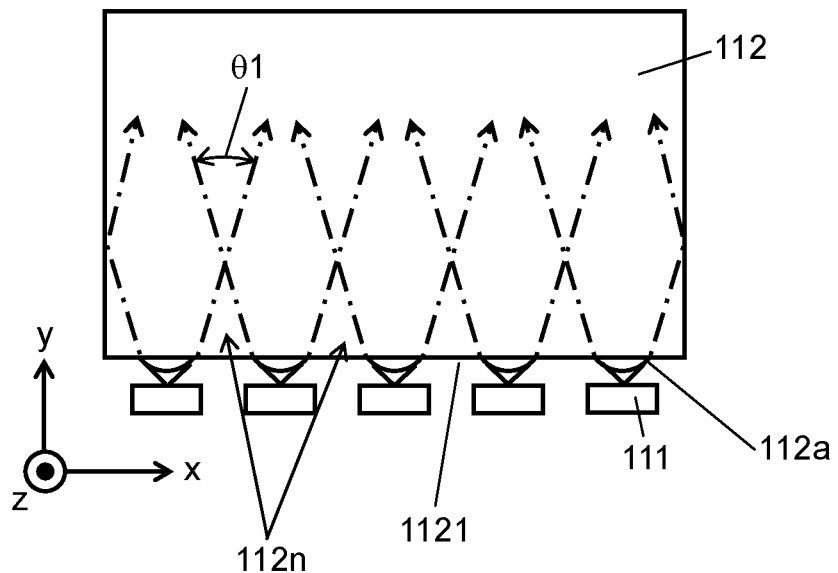
FIG. 4 is a schematic diagram illustrating a light beam incident on a light guide plate according to the first exemplary embodiment.

A light distribution of the light beam in light guide plate 112 will be described below. FIG. 4 is a schematic diagram illustrating a light beam incident on light guide plate 112 according to the first exemplary embodiment. FIG. 4 is a view illustrating light guide plate 112 when light guide plate 112 is viewed from the third direction. Cylindrical shape part 112a deflects the angle spreading in the first direction of the light beam emitted from light source 111. Accordingly, the light beam incident on incident surface 1121 has the light distribution in which the angle spreading in the x-axis direction is θ1 with respect to the y-axis.

Figure 5:
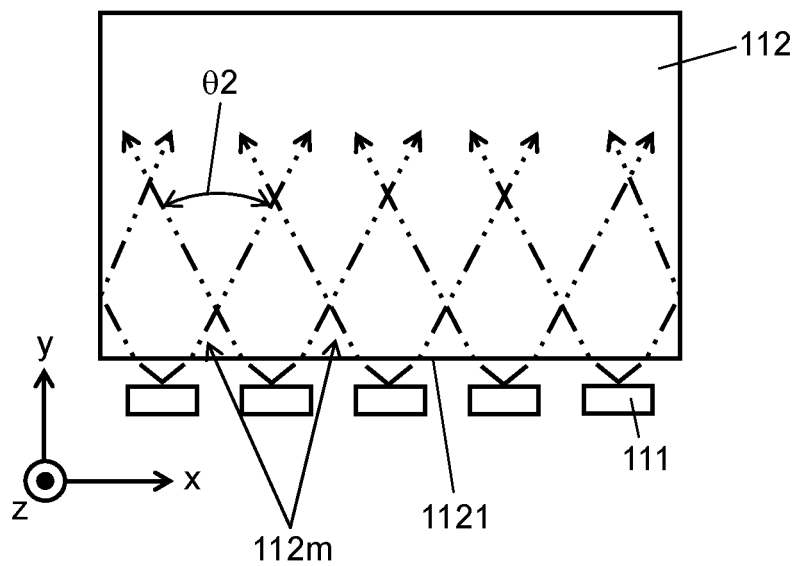
FIG. 5 is a schematic diagram illustrating the light beam incident on a light guide plate according to a comparative example.

On the other hand, FIG. 5 is a schematic diagram illustrating the light beam incident on light guide plate 112 according to a comparative example of the first exemplary embodiment. FIG. 5 is a view illustrating light guide plate 112 when light guide plate 112 is viewed from the third direction. In the comparative example, incident surface 1121 does not include cylindrical shape part 112a. For the comparative example, the light emitted from light source 111 directly enters incident surface 1121 from light source 111. The light beam incident on incident surface 1121 has the light distribution in which the angle spreading in the x-axis direction is θ2 with respect to the y-axis.

In the first exemplary embodiment, cylindrical shape part 112a of incident surface 1121 deflects the angle spreading in the x-axis direction of the light incident on incident surface 1121. Accordingly, angle θ1 is smaller than angle θ2. As a result, in the first exemplary embodiment, the light distribution spreading in the first direction (x-axis direction) can be narrowed.

Figure 6:
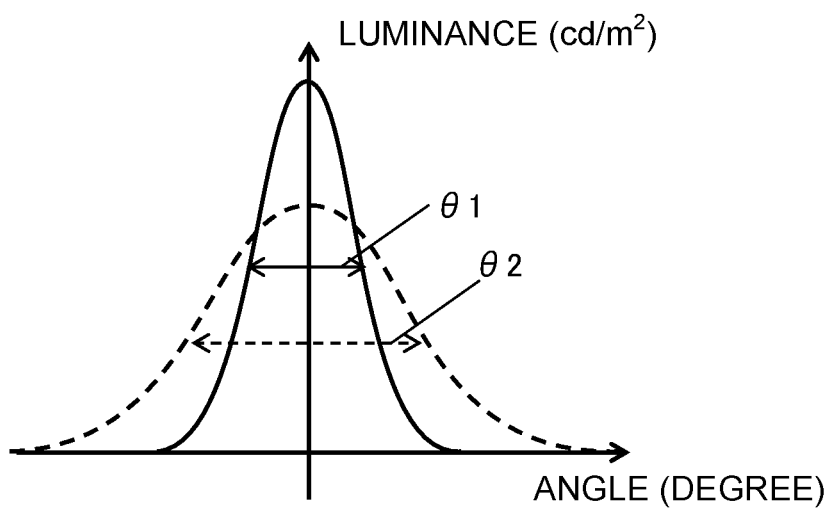
FIG. 6 is a graph illustrating a relationship between luminance and an angle of the light guide plate in the first exemplary embodiment and the comparative example.

FIG. 6 is a graph illustrating a relationship between the light distribution and the front luminance in the first exemplary embodiment and the comparative example. In the first exemplary embodiment, the front luminance at angle θ1 is a half of a peak value. In the comparative example, the front luminance at angle θ2 is a half of a peak value. As illustrated in FIG. 6, the first exemplary embodiment is narrower than the comparative example in the light distribution because angle θ1 is smaller than angle θ2. As can be also seen from FIG. 6, the peak value of the front luminance of the first exemplary embodiment is higher than the peak value of the front luminance of the comparative example.

On the other hand, as illustrated in FIGS. 4 and 5, ranges 112n and 112m where the light is not incident exist near incident surface 1121 of light guide plate 112. An area of range 112n of the first exemplary embodiment is wider than an area of range 112m of the comparative example. Therefore, in the first exemplary embodiment, as illustrated in FIG. 3, the light incident on light guide plate 112 is reflected by inclined surface 1122a and inclined surface 1122b, and the reflected light is extracted from output surface 1123. The light distribution can be spread to a certain extent by repetitively reflecting the light in light guide plate 112.

[1-4. Effects and Others]

As described above, image display device 120 for the head-up display of the first exemplary embodiment includes illumination device 110, light guide plate 112, light beam control member 114, and transmission type display panel 115. Illumination device 110 includes the plurality of light sources 111. Light guide plate 112 includes incident surface 1121 into which the light from illumination device 110 enters, incident surface 1121 including the plurality of convex surfaces 112b each of which is opposed to each of the plurality of light sources 111, and output surface 1123 disposed in the direction intersecting incident surface 1121 and from which the light incident from incident surface 1121 is output. Light beam control member 114 controls the traveling direction of the light output from output surface 1123. Transmission type display panel 115 transmits the light output from light beam control member 114 to display the image.

Therefore, image display device 120 can narrow the light distribution. As a result, the front luminance can be improved when image display device 120 is viewed from the third direction.

In the first exemplary embodiment, each convex surface 112b is curved while projecting toward the direction opposed to each light source 111. The axis of the curvature center of each convex surface 112b is perpendicular to the xy-plane. Therefore, in the first exemplary embodiment, the light distribution spreading in the first direction (x-axis direction) of the light incident from light source 111 into light guide plate 112 can be narrowed with respect to the second direction (y-axis direction). As a result, the front luminance can be improved when image display device 120 is viewed from the third direction.

In the first exemplary embodiment, counter surface 1124 is inclined with respect to output surface 1123. Additionally, the gap between at least a part of counter surface 1124 and output surface 1123 increases with increasing distance from incident surface 1121. Therefore, in the first exemplary embodiment, the light incident from incident surface 1121 can be guided to inclined surface 1122a and inclined surface 1122b while angle θ formed between the light and the y-axis direction increases gradually. The light is reflected by inclined surface 1122a and inclined surface 1122b, and the light can be extracted while repetitively reflected in light guide plate 112. The light distribution can be spread to a certain extent because the light is repetitively reflected in light guide plate 112. Accordingly, the optical path in which the light spreads can sufficiently be secured in light guide plate 112. As a result, the evenness of the luminance distribution of image display device 120 can be improved while the front luminance increases.

In the first exemplary embodiment, by adjusting the angles of inclined surface 1122a and inclined surface 1122b, the deflection can be performed such that angle θ increases. Accordingly, the light can be extracted from output surface 1123 near inclined surface 1122a and inclined surface 1122b. As a result, the evenness of the luminance distribution can be improved.

Light guide plate 112 has the wedge shape, and a light guide plate 112 is reduced in thickness toward the traveling direction of the reflected light, namely, from inclined surface 1122a and inclined surface 1122b toward incident surface 1121. Angle θ of the light reflected from inclined surface 1122a and inclined surface 1122b increases gradually. Accordingly, the reflected light can gradually be extracted from output surface 1123. As a result, the evenness of the luminance distribution of image display device 120 can be improved.

As described above, in the first exemplary embodiment, the front luminance can be increased, and the evenness of the luminance distribution can be improved. The front luminance of the display projected onto windshield 230 of head-up display 100 can be improved by increasing the front luminance of image display device 120. The evenness of the luminance distribution of the display projected onto windshield 230 of head-up display 100 can be improved by improving the evenness of the luminance distribution of image display device 120.

Second Exemplary Embodiment

Figure 8:
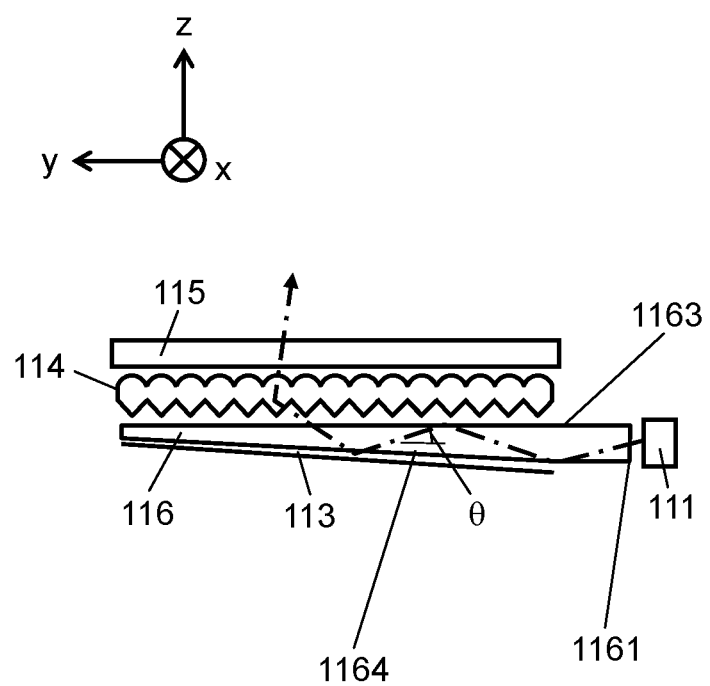
FIG. 8 is a schematic diagram illustrating a section of the image display device according to the second exemplary embodiment.
Figure 9:
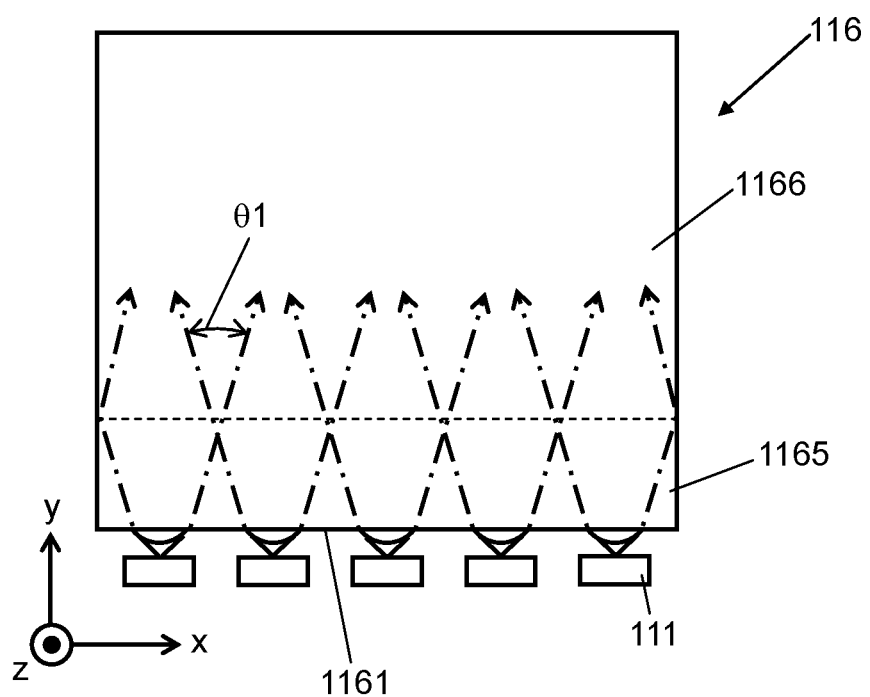
FIG. 9 is a schematic diagram illustrating a light beam incident on a light guide plate according to the second exemplary embodiment.

A second exemplary embodiment will be described below with reference to FIGS. 7 to 9. The second exemplary embodiment differs from the first exemplary embodiment in a shape of light guide plate 116. The component having the configuration and function similar to those of the first exemplary embodiment is designated by the similar reference numeral, and the detailed description of the similar configuration and function and the description of the similar effect are omitted in some cases.

[2-1. Configuration of Image Display Device]

Figure 7:
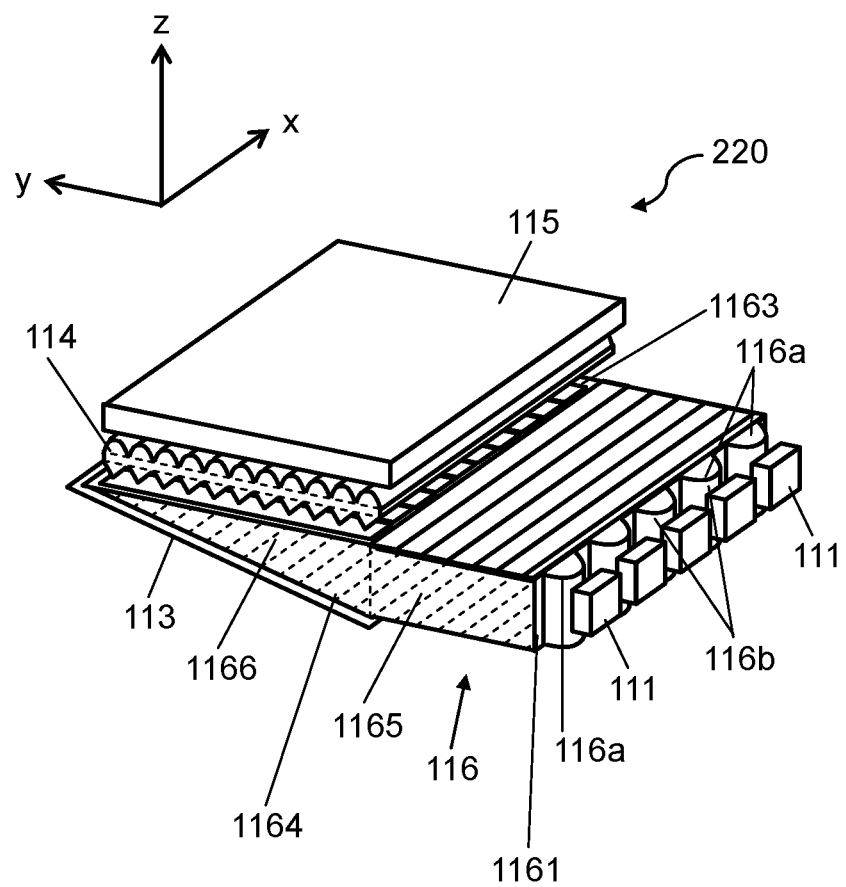
FIG. 7 is a schematic diagram illustrating an image display device according to a second exemplary embodiment.

FIG. 7 is a schematic diagram illustrating a configuration of an image display device according to the second exemplary embodiment. In the following description, an output side (of the light) means an upper side in FIG. 7.

Image display device 220 includes the plurality of light sources 111, light guide plate 116, specular reflection member 113, light beam control member 114, and transmission type display panel 115. Light source 111 is included in illumination device 110 of FIG. 1. Image display device 220 is used in head-up display 100 of FIG. 1.

As illustrated in FIG. 7, the plurality of light sources 111 are arrayed in line in the first direction (x-axis direction).

Light guide plate 116 is aligned with the second direction (y-axis direction) with respect to the plurality of light sources 111. Light guide plate 116 is disposed in proximity to light source 111 to an extent in which the light beams emitted from light sources 111 do not leak. A surface of light guide plate 116 includes incident surface 1161, output surface 1163, and counter surface 1164. Light guide plate 116 includes first region 1165 and second region 1166. First region 1165 has a predetermined length from incident surface 1161 in the second direction. In first region 1165, a thickness in the third direction (z-axis direction) is kept constant irrespective of the position in the second direction. Second region 1166 is a region excluding first region 1165 in light guide plate 116, and second region 1166 has a predetermined length from first region 1165 in the second direction. In second region 1166, a thickness in the third direction becomes thinner with increasing distance from incident surface 1161 along the second direction. Second region 1166 has a wedge shape.

The light beams emitted from the plurality of light sources 111 enter incident surface 1161. Incident surface 1161 includes a plurality of convex surfaces 116*b*. Each convex surface 116*b* is opposed to each light source 111. Each convex surface 116*b* is a curved surface that projects toward the second direction. The axis of the curvature center of each convex surface 116*b* is perpendicular to the xy-plane. In light guide plate 116*a* portion including each convex surface 116*b* is referred to as cylindrical shape part 116*a*. Each cylindrical shape part 116*a* has a semi-columnar shape in which an axis parallel to the third direction (z-axis direction) is set to the generating axis. A yz-section and an xz-section of each cylindrical shape part 116*a* have a rectangular shape. A plurality of cylindrical shape parts 116*a* are arrayed in the first direction. Each cylindrical shape part 116*a* is formed integral with light guide plate 116.

Output surface 1163 is disposed in a direction intersecting incident surface 1161. The light incident from incident surface 1161 is output from output surface 1163. Output surface 1163 is defined by the first direction and the second direction orthogonal to the first direction.

Preferably, output surface 1163 includes a lenticular lens shape part. The lenticular lens shape part is configured by the plurality of cylindrical shape parts. Preferably, first region 1165 differs from second region 1166 in the array direction of the cylindrical shape parts. Preferably, in first region 1165, the generating axis of each cylindrical shape part is parallel to the first direction. Preferably, the cylindrical shape parts in first region 1165 are arrayed in the second direction. Therefore, the stripe luminance unevenness, which is arranged in the second direction and is parallel to the first direction, can be reduced. Preferably, in second region 1166, the generating axis of each cylindrical shape part is parallel to the second direction. Preferably, the cylindrical shape parts in second region 1166 are arrayed in the first direction. Therefore, the stripe luminance unevenness, which is arranged in the first direction and is parallel to the second direction, can be reduced.

Counter surface 1164 is opposed to output surface 1163. In first region 1165, counter surface 1164 and output surface 1163 are parallel to each other. In second region 1166, counter surface 1164 is inclined with respect to output surface 1163. A gap between counter surface 1164 and output surface 1163 in the third direction decreases with increasing distance from incident surface 1161.

Preferably, counter surface 1164 in first region 1165 includes a plurality of prism shape parts. Preferably, the generating axis of each prism shape part in first region 1165 is parallel to the first direction. Preferably, the prism shape parts in first region 1165 are arrayed in the second direction. Therefore, the angle (angle θ in FIG. 8) of the light beam with respect to the second direction can be increased. Accordingly, the light can be extracted from output surface 1163 near light source 111.

Preferably, counter surface 1164 in second region 1166 also includes a plurality of prism shape parts. Preferably, the generating axis of each prism shape part in second region 1166 is parallel to the first direction. Preferably, the prism shape parts in second region 1166 are arrayed in the second direction. Therefore, the angle (angle θ in FIG. 8) of the light beam with respect to the second direction can be increased. Accordingly, light extraction efficiency can be improved in second region 1166 of light guide plate 116.

The light beam is raised in the third direction by the prism shape part of counter surface 1164. The stripe unevenness parallel to the first direction may be generated near incident surface 1161. However, in the second exemplary embodiment, output surface 1163 of first region 1165 includes the cylindrical shape part parallel to the first direction. Accordingly, the stripe luminance unevenness parallel to the first direction can be reduced.

Specular reflection member 113 is disposed on the side opposite to output surface 1163, namely, a counter surface 1164 side in light guide plate 116.

Light beam control member 114 is disposed on an output side of light guide plate 116. That is, light beam control member 114 is disposed between light guide plate 116 and transmission type display panel 115. In the second exemplary embodiment, light beam control member 114 is disposed on second region 1166 of light guide plate 116. Light beam control member 114 is not disposed on first region

1165. Light beam control member 114 includes the line of triangular prisms in a surface opposed to light guide plate 116. The triangular prisms have a triangle pole shape in which the first direction is set to the generating axis. The triangular prisms are arrayed in the second direction. In light beam control member 114, a row of cylindrical lenses is included in a surface opposite to a surface in which the triangular prisms are formed, namely, a surface on the output side. The cylindrical lenses have a semi-columnar shape in which the first direction is set to the generating axis. The cylindrical lenses are arrayed in the second direction. A row of cylindrical lenses is parallel to a row of triangular prisms.

Transmission type display panel 115 is disposed on the output side of light beam control member 114. That is, transmission type display panel 115 is disposed on second region 1166 with light beam control member 114 interposed therebetween. Transmission type display panel 115 is not disposed on first region 1165.

[2-2. Detailed Description of Optical Path]

An optical path of the second exemplary embodiment will be described below. FIG. 8 is a schematic diagram illustrating a section (yz-section) of image display device 220 according to the second exemplary embodiment. An alternate long and short dash line in FIG. 8 indicates the optical path in which the light emitted from light source 111 is output from transmission type display panel 115 through light guide plate 116 and light beam control member 114

The plurality of light sources 111 emit light. The light emitted from each light source 111 enters incident surface 1161 of light guide plate 116, and travels along the second direction. In the yz-plane of FIG. 8, a smaller angle of angles formed between the light beam and the y-axis is set to angle $\theta$. In first region 1165, the light is guided while angle $\theta$ is increased by the prism shape part formed in counter surface 1164. Therefore, the light can be extracted near light source 111 of transmission type display panel 115. In second region 1166, a gap between output surface 1163 and counter surface 1164 in the third direction decreases with increasing distance from incident surface 1161 in the second direction. Accordingly, angle $\theta$ increases gradually with increasing distance from incident surface 1161 in the second direction. The prism shape part formed in counter surface 1164 deflects the light guided to light guide plate 116 such that angle $\theta$ increases. Thus, the light is guided to the second direction while angle $\theta$ increases gradually in light guide plate 116. Therefore, the light can gradually be extracted from output surface 1163. As a result, the evenness of the luminance distribution of image display device 220 increases.

Light beam control member 114 converts the angle with respect to the third direction of the light beam extracted from output surface 1163, and the light is transmitted through transmission type display panel 115.

The light beam extracted from counter surface 1164 is reflected by specular reflection member 113. The reflected light passes through output surface 1163. Light beam control member 114 converts the angle with respect to the third direction of the light passing through output surface 1163, and the light is transmitted through transmission type display panel 115.

A light distribution of the light beam in light guide plate 116 will be described below. FIG. 9 is a schematic diagram illustrating the light beam incident on light guide plate 116 according to the second exemplary embodiment. FIG. 9 is a view illustrating light guide plate 116 when light guide plate 116 is viewed from the third direction.

In the second exemplary embodiment, cylindrical shape part 116a of incident surface 1161 deflects the angle spreading in the first direction of the light emitted from light source 111. The light beam incident on incident surface 1161 becomes the light distribution having angle $\theta 1$. Accordingly, the light distribution of the light spreading in the first direction can be narrowed.

Light guide plate 116 includes first region 1165, in which the thickness in the third direction is kept constant, on the side close to incident surface 1161. Accordingly, the light can sufficiently be spread in first region 1165.

[2-4. Effects and Others]

In the second exemplary embodiment, cylindrical shape part 116a provided in incident surface 1161 can narrow the light distribution of the light spreading in the first direction. As a result, the front luminance can be improved when image display device 220 is viewed from the third direction.

In the second exemplary embodiment, the plurality of convex surfaces 116b are a curved surface projecting toward the direction opposed to the plurality of light sources 111. The axis of the curvature center of each convex surface 116b is perpendicular to output surface 1163. Therefore, in the second exemplary embodiment, the light distribution spreading in the first direction of the light incident from light source 111 into light guide plate 116 can be narrowed with respect to the second direction. As a result, the front luminance can be improved when image display device 220 is viewed from the third direction.

In the second exemplary embodiment, in second region 1166 of light guide plate 116, the gap between output surface 1163 and counter surface 1164 in the third direction decreases with increasing distance from incident surface 1161. Therefore, angle $\theta$ in the light guided to light guide plate 116 can gradually be increased with respect to the y-axis. Accordingly, the light can gradually be extracted from output surface 1163. As a result, the evenness of the luminance distribution of image display device 220 increases.

In the second exemplary embodiment, first region 1165 in which output surface 1163 and counter surface 1164 are substantially parallel to each other is included near incident surface 1161. Therefore, the light can sufficiently be spread in first region 1165. Accordingly, the luminance unevenness can also be reduced near light source 111 of transmission type display panel 115.

In the second exemplary embodiment, light beam control member 114 and transmission type display panel 115 are provided on second region 1166. The light transmitted through output surface 1163 of second region 1166 is made incident on transmission type display panel 115. The light sufficiently diffused in first region 1165 of light guide plate 116 is gradually extracted from output surface 1163 of second region 1165, and is made incident on transmission type display panel 115. Accordingly, the evenness of the luminance distribution of image display device 220 can be improved.

In the second exemplary embodiment, the front luminance of image display device 220 can be increased, and the evenness of the luminance distribution can be improved.

The front luminance of the display projected onto windshield 230 of head-up display 100 can be improved by increasing the front luminance of image display device 220. The evenness of the luminance distribution of the display projected onto windshield 230 of head-up display 100 can be improved by improving the evenness of the luminance distribution of image display device 220.

In the second exemplary embodiment, light beam control member 114 and transmission type display panel 115 are disposed, not on first region 1165, but on second region 1166. However, for example, light beam control member 114 and transmission type display panel 115 may be disposed on a region, which is a part of first region 1165 and on a second region 1166 side (on the side opposite to incident surface 1161). Even in first region 1165, the light is sufficiently diffused as the region comes closer to second region 1165. Accordingly, the evenness of the luminance distribution can be improved when the light is extracted from output surface 1163 in the region.

Third Exemplary Embodiment

A third exemplary embodiment will be described below with reference to FIGS. 10, 11A, and 11B. In addition to the configuration of the first exemplary embodiment, image display device 320 of the third exemplary embodiment includes polarized light rotation member 117, polarized light reflection member 118, and light beam deflection member 119. The component having the configuration and function similar to those of the first exemplary embodiment is designated by the similar reference numeral, and the detailed description of the similar configuration and function and the description of the similar effect are omitted in some cases.

[3-1. Configuration of Image Display Device]

Figure 10:
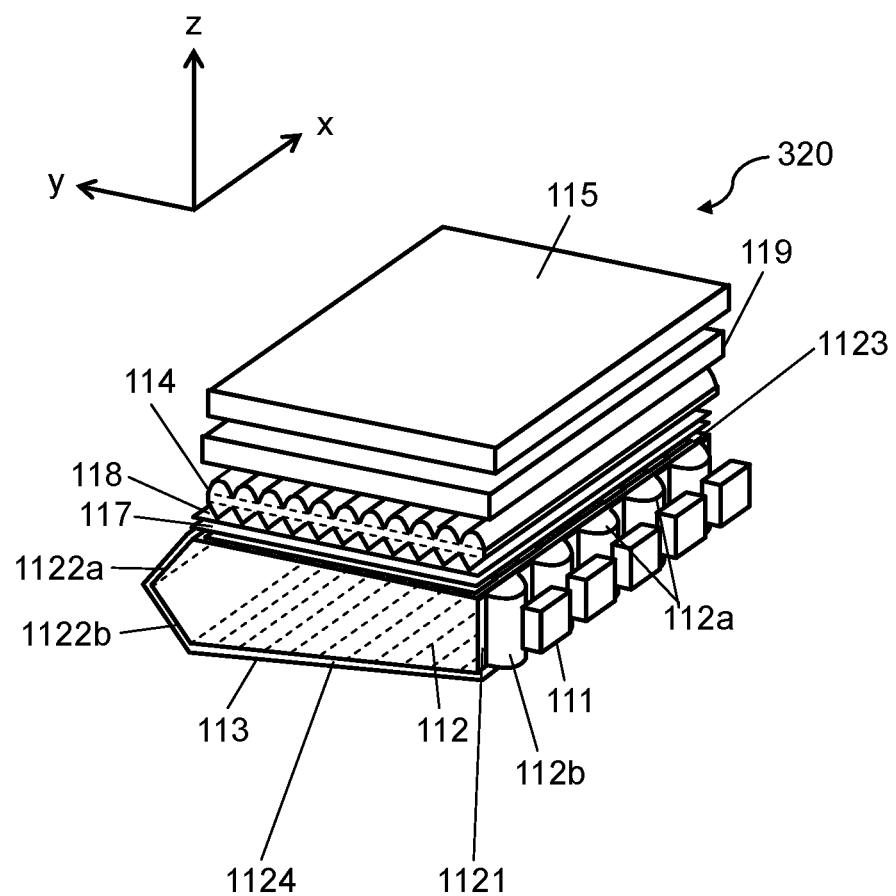
FIG. 10 is a schematic diagram illustrating an image display device according to a third exemplary embodiment.

FIG. 10 is a schematic diagram illustrating a configuration of image display device 320 according to the third exemplary embodiment. In the following description, an output side (of the light) means an upper side in FIG. 10.

Image display device 320 includes the plurality of light sources 111, light guide plate 112, specular reflection member 113, polarized light rotation member 117, polarized light reflection member 118, light beam control member 114, light beam deflection member 119, and transmission type display panel 115. Light source 111 is included in illumination device 110 of FIG. 1. Image display device 320 is used in head-up display 100 of FIG. 1.

As illustrated in FIG. 10, the plurality of light sources 111 are arrayed in line in the first direction (x-axis direction).

Light guide plate 112 is aligned with the second direction (y-axis direction) with respect to the plurality of light sources 111. The surface of light guide plate 112 includes incident surface 1121, inclined surface 1122a, inclined surface 1122b, output surface 1123, and counter surface 1124.

The light beams emitted from the plurality of light sources 111 enter incident surface 1121. Incident surface 1121 includes the plurality of convex surfaces 112b. Each convex surface 112b is opposed to each light source 111. In light guide plate 116, a portion including each convex surface 112b is referred to as cylindrical shape part 112a.

Output surface 1123 is disposed in a direction intersecting incident surface 1121. The light incident from incident surface 1121 is output from output surface 1123. Output surface 1123 is defined by the first direction and the second direction.

Counter surface 1124 is opposed to output surface 1123. The gap between counter surface 1124 and output surface 1123 in the third direction increases with increasing distance from incident surface 1121. Accordingly, the yz-section of light guide plate 112 has a wedge shape.

Specular reflection member 113 is disposed on counter surface 1124, inclined surface 1122a, and inclined surface 1122b.

Polarized light rotation member 117 is opposed to output surface 1123. Polarized light rotation member 117 rotates the light from polarized light reflection member 118, and guides the light into the third direction. In the third exemplary embodiment, polarized light rotation member 117 rotates the light from polarized light reflection member 118 by 90 degrees. An example of polarized light rotation member 117 includes a quarterwave plate. Polarized light rotation member 117 may be made of other materials as long as the polarized light can be rotated. For example, a transparent film exhibiting birefringence may be used as polarized light rotation member 117.

Polarized light reflection member 118 is disposed on the output side of polarized light rotation member 117. That is, polarized light reflection member 118 is disposed between polarized light rotation member 117 and light beam control member 114. Polarized light reflection member 118 transmits the polarized light transmitted through transmission type display panel 115, and reflects the polarized light perpendicular to the polarized light transmitted through transmission type display panel 115. When the light reflected by polarized light reflection member 118 is rotated by 90 degrees by the above-described polarized light rotation member, the light can efficiently be guided to light beam control member 114. Polarized light reflection member 118 and polarized light rotation member 117 may be pasted together.

Light beam deflection member 119 is disposed on the output side of light beam control member 114.

Light beam deflection member 119 has a function of changing an output direction of the light beam at each position of light beam deflection member 119 according to the position where image display device 320 is observed. For example, in the case where image display device 320 is applied to head-up display 100 as illustrated in FIG. 1, the light beam incident on eye-box 600 is illustrated in FIGS. 11A and 11B. Eye-box 600 is a range in which the virtual image can be seen through virtual image optical system 500 including reflection optical unit 130 and windshield 230. As illustrated in FIGS. 11A and 11B, it is necessary that a central portion and an end of transmission type display panel 115 differ from each other in an output angle of the light output from transmission type display panel 115. At the end of transmission type display panel 115, it is necessary that the light be output outward with respect to transmission type display panel 115. At this point, in FIG. 11A, it is assumed that $\alpha 1$ is the output angle of the light output from the central portion of transmission type display panel 115, and that $\alpha 2$ is the output angle of the light output from the end. Light beam deflection member 119 can adjust the angle such that output angle $\alpha 2$ differs from output angle $\alpha 1$. In this case, a concave lens is preferably used as light beam deflection member 119.

Light beam control member 114 is disposed on the output side of polarized light reflection member 118. That is, light beam control member 114 is disposed between polarized light reflection member 118 and light beam deflection member 119.

Light beam control member 114 includes the line of triangular prisms in a surface opposed to polarized light reflection member 118. The generating axis of each triangular prism is parallel to the first direction. The triangular prisms are arrayed in the second direction. Light beam control member 114 includes the row of cylindrical lenses in a surface on the output side. The generating axis of each cylindrical lens is parallel to the first direction. The cylindrical lenses are arrayed in the second direction. The row of cylindrical lenses is parallel to the row of triangular prisms.

Transmission type display panel 115 is disposed on the output side of light beam deflection member 119.

Figure 11A:
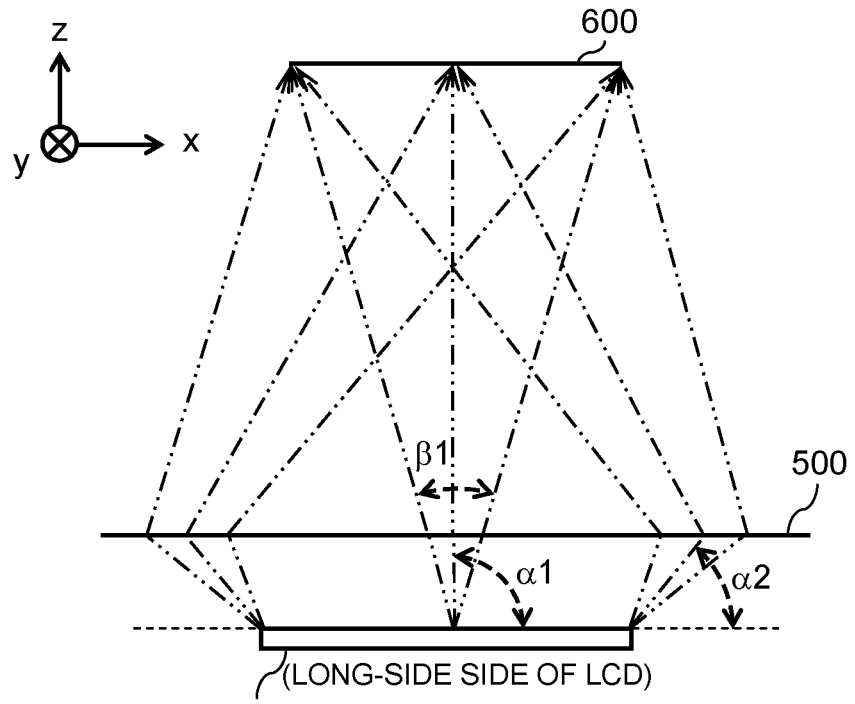
FIG. 11A is a schematic diagram illustrating a part of an optical path of the head-up display.
Figure 11B:
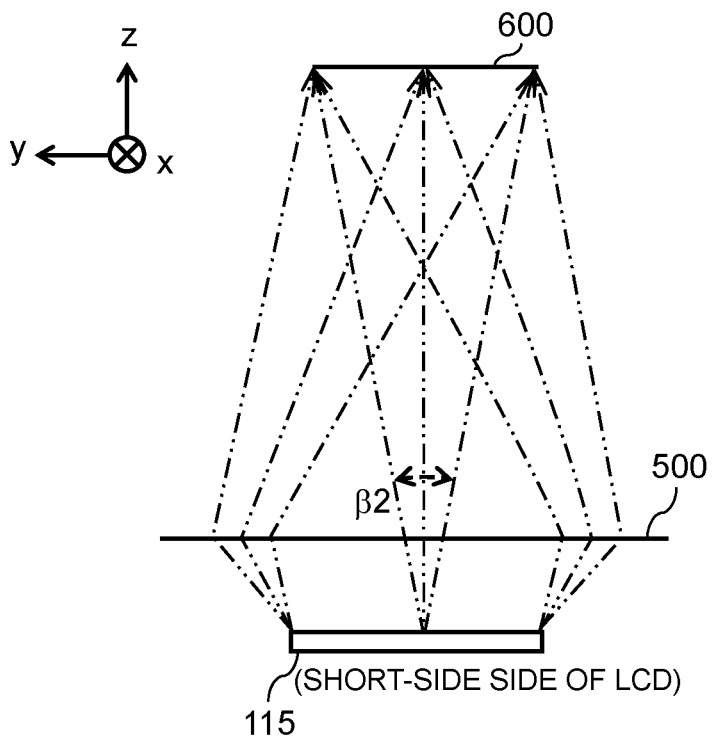
FIG. 11B is a schematic diagram illustrating a part of the optical path of the head-up display.

FIGS. 11A and 11B illustrate an optical path of the light output from transmission type display panel 115 when image display device 320 is applied to the head-up display. The optical path in FIG. 11A is viewed from a section (xz-section) of a long-side side of transmission type display panel 115. The optical path in FIG. 11B is viewed from a section (yz-section) of a short-side side of the transmission type display panel.

As illustrated in FIGS. 11A and 11B, a light distribution angle of the light output from transmission type display panel 115 varies, and light distribution angle 131 in a long-side direction is larger than light distribution angle 132 in a short-side direction. In the third exemplary embodiment, it is easy to decrease light distribution angle 132 spreading in the second direction (y-axis direction) compared with light distribution angle 131 spreading in the first direction (x-axis direction). Accordingly, transmission type display panel 115 is desirably disposed such that the long-side direction of transmission type display panel 115 corresponds to the first direction.

[3-2. Effects and Others]

In the third exemplary embodiment, the use of polarized light rotation member 117 and polarized light reflection member 118 can efficiently use the light emitted from light source 111.

Eye-box 600 can be set in a desired range by disposing light beam deflection member 119 between light beam controller 114 and transmission type display panel 115.

Other Exemplary Embodiments

As described above, the first to third exemplary embodiments have been described as illustration of the technique disclosed in this application. However, the technique of the present disclosure is not limited to the first exemplary embodiment, but is applicable to another exemplary embodiment in which a change, a replacement, an addition, or an omission is appropriately made. In addition, the components described in the first to third exemplary embodiments can be combined to obtain a new exemplary embodiment.

Then, other exemplary embodiments will be described below.

In the above exemplary embodiments, the TFT transmission type liquid crystal panel is used as transmission type display panel 115. However, another display element can be used as long as the display element is a transmission type display device.

In the third exemplary embodiment, the concave lens is used as light beam deflection member 119. Alternatively, a Fresnel lens may be used as light beam deflection member 119. Therefore, a thinner lens can be provided.

In the above exemplary embodiments, light guide plate 112 or light guide plate 116 and transmission type display panel 115 are disposed so as to be parallel to each other. Alternatively, light guide plate 112 or light guide plate 116 and transmission type display panel 115 may be disposed so as to be inclined.

In the third exemplary embodiment, polarized light rotation member 117 is disposed between light guide plate 112 and polarized light reflection member 118. Alternatively, polarized light rotation member 117 may be disposed between light guide plate 112 and specular reflection member 113.

In the above exemplary embodiments, the LED is used as light source 111. Alternatively, a laser diode or an organic light emitting diode may be used as light source 111.

The moving body equipped with head-up display 100 of the first to third exemplary embodiments is not limited to an automobile, but includes a railroad vehicle, a motorcycle, an airplane, a helicopter, a vessel, and various devices that carry a person.

As described above, the exemplary embodiments have been described for exemplifying the technique of the present disclosure. The appended drawings and the detailed description have been provided for that purpose.

Accordingly, in order to exemplify the above technique, the accompanying drawings and the detailed description include not only components that are essential for solving problems, but also components that are not essential for solving the problems. Accordingly, it should not be construed that the component that are not essential are essential because the components are described in the appended drawings and the detailed description.

In addition, since the above exemplary embodiments are used for exemplifying the technique of the present disclosure, various modifications, replacements, additions, and omissions can be made within the scope of the claims and their equivalents.

INDUSTRIAL APPLICABILITY

The present disclosure can be applied to the image display device. Specifically, the present disclosure can be applied to the head-up display.

REFERENCE MARKS IN THE DRAWINGS

100: head-up display
110: illumination device (illumination unit)
111: light source
112, 116: light guide plate
112a, 116a: cylindrical shape part
112b, 116b: convex surface
1121, 1161: incident surface
1122a, 1122b: inclined surface
1123, 1163: output surface
1124, 1164: counter surface
1165: first region
1166: second region
113: specular reflection member (reflection member)
114: light beam control member (light beam controller)
115: transmission type display panel (display unit)
117: polarized light rotation member
118: polarized light reflection member
119: light beam deflection member
120, 220, 320: image display device
130: reflection optical unit
131: first mirror
132: second mirror
140: housing
141: opening
200: vehicle
230: windshield
300: observer
400: virtual image
500: virtual image optical system
600: eye-box

The invention claimed is:

1. An image display device used in a head-up display, the image display device comprising:
an illumination unit including a plurality of light sources;
a light guide plate including an incident surface which light from the illumination unit enters, the incident surface including a plurality of convex surfaces which is opposed to the respective plurality of light sources, an output surface disposed in a direction intersecting the incident surface and from which the light incident from the incident surface is output, and a counter surface opposed to the output surface;
a light beam controller that is arranged to cover a part of the output surface and controls a traveling direction of the light output from the output surface; and
a display that transmits the light output from the light beam controller to display an image,
wherein a first lenticular lens array is provided on a part of the output surface on which the light beam controller is not arranged.

2. The image display device according to claim 1, wherein the plurality of light sources are arrayed in a first direction, and
the first lenticular lens array is arrayed in a second direction intersecting the first direction.

3. The image display device according to claim 2, wherein a second lenticular lens array arrayed in the first direction intersecting the first lenticular lens array is arrayed on a part of the output surface on which the light beam controller is arranged.

4. The image display device according to claim 3, wherein the second lenticular lens array has a plurality of cylindrical shape parts, and
a generating axis of each of the plurality of cylindrical shape parts is parallel to the second direction.

5. The image display device according to claim 1, wherein the plurality of convex surfaces are curved while projecting in a direction opposed to the respective plurality of light sources, and
an axis of a curvature center in each of the plurality of convex surfaces is perpendicular to the output surface.

6. The image display device according to claim 1, wherein at least a part of the counter surface is inclined with respect to the output surface.

7. The image display device according to claim 1, wherein the light guide plate includes a reflection member disposed close to the counter surface.

8. The image display device according to claim 1, wherein a gap between at least a part of the counter surface and the output surface decreases with increasing distance from the incident surface.

9. The image display device according to claim 1, wherein a part of the counter surface, opposed to a part of the output surface on which the light beam controller is not arranged, is substantially parallel to the output surface, and a part of the counter surface, opposed to a part of the output surface on which the light beam controller is arranged, is inclined with respect to the output surface.

10. The image display device according to claim 1, further comprising a concave lens between the light beam controller and the display.

11. The image display device according to claim 1, wherein
the first lenticular lens array has a plurality of cylindrical shape parts, and
a generating axis of each of the plurality of cylindrical shape parts is parallel to the first direction.

12. The image display device according to claim 1, wherein
a plurality of prism shape parts arrayed in the second direction are arrayed on a part of the counter surface opposed to a part of the output surface on which the light beam controller is not arranged.

13. The image display device according to claim 12, wherein
a generating axis of each of the plurality of prism shape parts is parallel to the first direction.

14. The image display device according to claim 1, wherein
a plurality of prism shape parts arrayed in the second direction are arrayed on a part of the counter surface opposed to a part of the output surface on which the light beam controller is arranged.

15. The image display device according to claim 14, wherein
a generating axis of each of the plurality of prism shape parts is parallel to the first direction.

16. A head-up display comprising:
an image display device including
an illumination unit including a plurality of light sources,
a light guide plate including an incident surface which light from the illumination unit enters, the incident surface including a plurality of convex surfaces which is opposed to the respective plurality of light sources, an output surface disposed in a direction intersecting the incident surface and from which the light incident from the incident surface is output, and a counter surface opposed to the output surface,
a light beam controller that is arranged to cover a part of the output surface and controls a traveling direction of the light output from the output surface, and
a display that transmits the light output from the light beam controller to display an image,
a lenticular lens array being provided on a part of the output surface on which the light beam controller is not arranged; and
a reflection optical unit that reflects the light output from the image display device,
wherein the light output from the reflection optical unit is introduced to an eye-box of an observer through a transparent member, and the observer is caused to visually recognize a virtual image.

* * * * *